(12) United States Patent
McCarthy

(10) Patent No.: US 6,385,919 B1
(45) Date of Patent: *May 14, 2002

(54) DISASTER SHELTER

(76) Inventor: Walton W. McCarthy, 222 Blakes Hill Rd., Northwood, NH (US) 03261

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/408,706

(22) Filed: Sep. 30, 1999

(51) Int. Cl.[7] .............................................. E04H 9/14
(52) U.S. Cl. .................................... 52/169.6; 109/1 S
(58) Field of Search .......................... 52/79.9, 143, 19, 52/20, 169.1, 169.6; 109/1 S

(56) References Cited

U.S. PATENT DOCUMENTS

| | | | | |
|---|---|---|---|---|
| 2,413,243 A | * | 12/1946 | Neff | 52/169.6 X |
| 2,871,802 A | * | 2/1959 | Fishler | 109/1 S |
| 2,968,130 A | * | 1/1961 | Bascom | 52/169.6 X |
| 3,138,124 A | * | 6/1964 | Baier | 109/1 S |
| 3,196,813 A | * | 7/1965 | McHugh, Jr. | 109/1 S |
| 3,212,220 A | * | 10/1965 | Boniecki et al. | 52/169.6 X |
| 3,738,070 A | * | 6/1973 | Yarbrough | 52/169.6 X |
| 4,631,872 A | * | 12/1986 | Daroga | 52/1 |
| 4,660,334 A | * | 4/1987 | McCarthy | 52/169.6 |
| 4,955,166 A | * | 9/1990 | Qualline et al. | 52/169.6 |
| 5,115,613 A | * | 5/1992 | McCarthy | 52/169.6 |
| 5,615,640 A | * | 4/1997 | Luiz | 119/482 |
| 5,749,181 A | * | 5/1998 | Bauman | 52/169.6 |
| 5,930,961 A | * | 8/1999 | Beaudet | 52/169.6 |
| 6,061,976 A | * | 5/2000 | Willbanks, Jr. | 52/169.6 |

FOREIGN PATENT DOCUMENTS

| | | | | |
|---|---|---|---|---|
| FR | 1314461 | * | 12/1962 | 52/169.6 |
| GB | 507111 | * | 6/1939 | 52/169.6 |
| GB | 2081766 | * | 2/1982 | 52/169.6 |

* cited by examiner

Primary Examiner—Laura A. Callo
(74) Attorney, Agent, or Firm—Michael J. Persson; Lawson, Philpot & Persson, P.C.

(57) ABSTRACT

A disaster shelter for mounting under ground. The shelter includes an entranceway having at least one air vent and a substantially hollow paraboloid shaped shelter cell. The shelter cell includes a paraboloid focus portion attached to the entranceway and paraboloid base portion disposed opposite the entranceway. A gravity ring is attached to the paraboloid base portion and is dimensioned such that the shelter is constrained within the ground when the water table reaches ground level.

20 Claims, 8 Drawing Sheets

DISASTER SHELTER

FIELD OF THE INVENTION

The present invention relates to the field of disaster shelters and, in particular, to a high force shelter and life support system that protects its inhabitants from tornadoes, hurricanes, earthquakes and other force generating disasters.

BACKGROUND OF THE INVENTION

History has shown that hurricanes, sudden tornadoes, and devastating earthquakes, can cause a significant loss of property and, more importantly, of human life. There are many ways to protect oneself from such catastrophic events. For example, cellars that are covered with concrete slabs or other sturdy rigid foundations may remain intact when in a worst case scenario the upper housing structure is destroyed or blown away. However, there is no guarantee that the structures above these cellars will not crash downward into the cellar. Further, modular or mobile homes are built upon slabs and, accordingly, offer no protection against the devastating forces of a hurricane, tornado or earthquake.

A tornado may have swirling winds forces that can reach speeds of over 200 MPH. This kind of wind force creates a type of suction force that has a tendency to pick up all sorts of structures to transport the same to a different location. Accordingly, it is important that people have strong shelters available within a short distance or in close proximity to where they live.

A number of underground shelters have been developed to protect inhabitants in the event of a hurricane or tornado. U.S. Pat. No. 5,829,208 issued Nov. 3, 1998 describes a steel reinforced cylindrical structure having a bell-shaped end at one end and a spigot at the other end. It is of a size to comfortably protect up to 10 people within its interior. One end of the structure is closed by a concrete end wall while the other end is partially closed by a slanting concrete deflector wall. The deflector wall at its upper end may or may not be fastened to the top of the cylindrical structure.

Although this structure could protect individuals from minor inclement weather, the design creates inherent problems during a disaster. First, concrete will leak while under ground for a long period of time. Thus, during a hurricane, the structure will leak, and the porous character inherent in concrete will only be augmented by winter freezing. Second, the cylindrical structure will not provide protection from a tornado, or strong hurricane winds. While cylinders provide protection from an evenly distributed force, a point force will crush the structure. Third, the structure is designed to be only partially underground which makes it vulnerable to heavy winds and complete exposure during a tornado, which would render the structure useless, and would crumble in the event of an earthquake. Fourth, this structure does not provide a life support system to provide fresh air in the event the disaster lasts longer than a few hours. Fifth, there are no communications devices in the event of a medical emergency, or inability to escape from the shelter because of heavy debris. Sixth, this shelter contains no structural elements that would prevent uplifting during times of high ground water. Finally, this shelter provides a single means of entry and egress, creating a possibility that inhabitants will be trapped by fallen debris.

U.S. Pat. No. 4,615,158 issued Oct. 7, 1986 describes a tornado shelter, specially adapted for use with mobile home lots. The shelter is an underground enclosure defined by an annular sidewall and a top and bottom. The top enclosure has an entrance and egress passageway in communication with both the enclosure and the bottom of a mobile home.

Although this shelter may provide protection from a low force tornado which lasts for a short period of time, or a short lived weak hurricane, this shelter is not suited to protect inhabitants from a Force 5 tornado, forceful hurricane or earth quake. The invention has a cylindrical shape, which only acts to disperse forces evenly over the entire structure when the force acts upon the structure evenly. If a hard force hits just one area of the structure, it will tend to buckle and destroy its integrity. The shelter is constructed from steel cylinder side walls and a concrete floor, which has a tendency to leak over time This shelter provides an entranceway made of a removable board from the floor of the mobile home, followed by a tube connecting the mobile home to the shelter. Therefore, if the mobile home is pulled off its foundation, the entrance tube will be openly exposed to the forceful winds of a tornado or hurricane. Since this tube is not in the ground, the result will most likely be a complete destruction of the entrance tube, and therefore full exposure of the inside of the shelter to the forceful winds and rain. Finally, this shelter also lacks all life sustaining mechanisms.

U.S. Pat. No. 4,955,166 issued Sep. 11, 1990 describes a generally spherical tornado shelter for safely housing and protecting people and things underground in the form of a truncated globe that is formed from a curved sidewall and terminates in the floor at the lower end thereof. The spherical shelter is preferably made of fiberglass and has a generally rectangular entrance formed in spaced relation to the central axis and provides a doorway into the interior of the structure. A plurality of steps lead from the entrance down the floor and enables people to conveniently walk through the entrance, down the steps, into and back up from the shelter.

Although this invention may provide protection from a low force tornado, this shelter has a structural design which will render the invention vulnerable in the event of a high force tornado or hurricane. Although made of fiberglass and virtually leak proof, the spherical shape is inherently weak when acted upon by point forces. The entrance is rectangular in shape and therefore susceptible to destruction by heavy force winds. Finally, even if the entrance remains intact through the disaster, a large amount of debris may become packed against the doorway, trapping the inhabitants inside.

Therefore, there is a need for a disaster shelter which provides protection from a tornado, hurricane, earthquake, chemical or biological disaster, that will not leak while under ground for a long period of time, that will not be crushed by a point force upon the structure, that provides a life support system to provide fresh air in the event the disaster lasts longer than a few hours that provides a communications device in the event of a medical emergency, or inability to escape from the shelter because of heavy debris, that will not be lifted from the ground in the event of high water table, that eliminates the possibility that inhabitants will be trapped by fallen debris.

SUMMARY OF THE INVENTION

The present invention is a disaster shelter for mounting under ground such that shelterists are protected from natural disasters such as tornadoes and hurricanes, and from human made disasters, such as bombs, armed invasions or the like. In its most basic form, the disaster shelter includes an entranceway having at least one air vent and a substantially hollow paraboloid shaped shelter cell. The shelter cell includes a paraboloid focus portion attached to the entranceway and paraboloid base portion disposed opposite the entranceway. A gravity ring is attached to the paraboloid base portion and is dimensioned such that the shelter is constrained within the ground when the water table reaches ground level.

The preferred disaster shelter includes a life support system made up of an air intake duct, an air filter, a blower and at least one battery. The air filter is preferably a highly efficient particulate air filter that filters particles from the air. The preferred blower includes an exhaust disposed within said shelter cell and wherein said exhaust is positioned to create cyclonic air movement within said shelter cell. The preferred battery comprises is a one twelve volt deep cycle battery having sufficient electrical energy, when fully charged, to power the blower to supply between 40 and 60 cubic feet per minute of air for six days. In some embodiments the battery is charged by a battery charger, such a solar panel.

The preferred entranceway includes a substantially cylindrical manway attached to the focus portion of the shelter cell. A hatch dome ring is disposed about, and extends outward from, the manway and a hatch dome cover is removably attached to the hatch dome ring such that the hatch dome cover forms a weather resistant seal with the hatch dome ring The preferred manway includes an air inlet and an air outlet, while the preferred hatch dome ring includes at least one inlet vent opening and at least one outlet vent opening. In such an embodiment, it is preferred that inlet vent opening and outlet vent opening be dimensioned and disposed relative to the air inlet and air outlet such that rain is prevented from entering the air inlet and air outlet. The preferred hatch dome cover is hatch dome ring form a substantially continuous surface having an angle of incidence of less than twenty degrees in order to protect the shelter from damage due to flying debris.

The preferred disaster shelter is manufactured of structural fiberglass that is capable of withstanding up to ten pounds per square inch of overpressure and an earthquake of an intensity of up to 8.5 on a Richter scale. An emergency escape manway is disposed through a side wall of the preferred shelter cell to allow egress in the event that the hatch dome cover cannot be opened. Finally, the preferred shelter includes a communications device, such as a two-way radio, for communicating with the outside world. In this preferred shelter, the two-way radio includes a retractable antenna to avoid damage during a tornado or other disaster.

Therefore, it is an aspect of the invention to provide a disaster shelter that provides protection from a tornado, hurricane, earthquake, chemical or biological disaster.

It is a further aspect of the invention to provide a disaster shelter that will not leak while under ground for a long period of time.

It is a further aspect of the invention to provide a disaster shelter that will not be crushed by a point force upon the structure.

It is a further aspect of the invention to provide a disaster shelter that includes a life support system for maintaining breathable air within the shelter.

It is a further aspect of the invention to provide a disaster shelter that remains restrained in the ground in areas of high water tables without the need for cables or other wires that can damage the shelter during an earthquake or other ground shock.

It is a further aspect of the invention to provide a disaster shelter that eliminates the possibility that inhabitants will be trapped by fallen debris.

It is a further aspect of the invention to provide a disaster shelter that includes a battery operated blower for circulating air within the shelter.

It is a further aspect of the invention to provide a disaster shelter that includes a battery operated communications device.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

Figure 1:
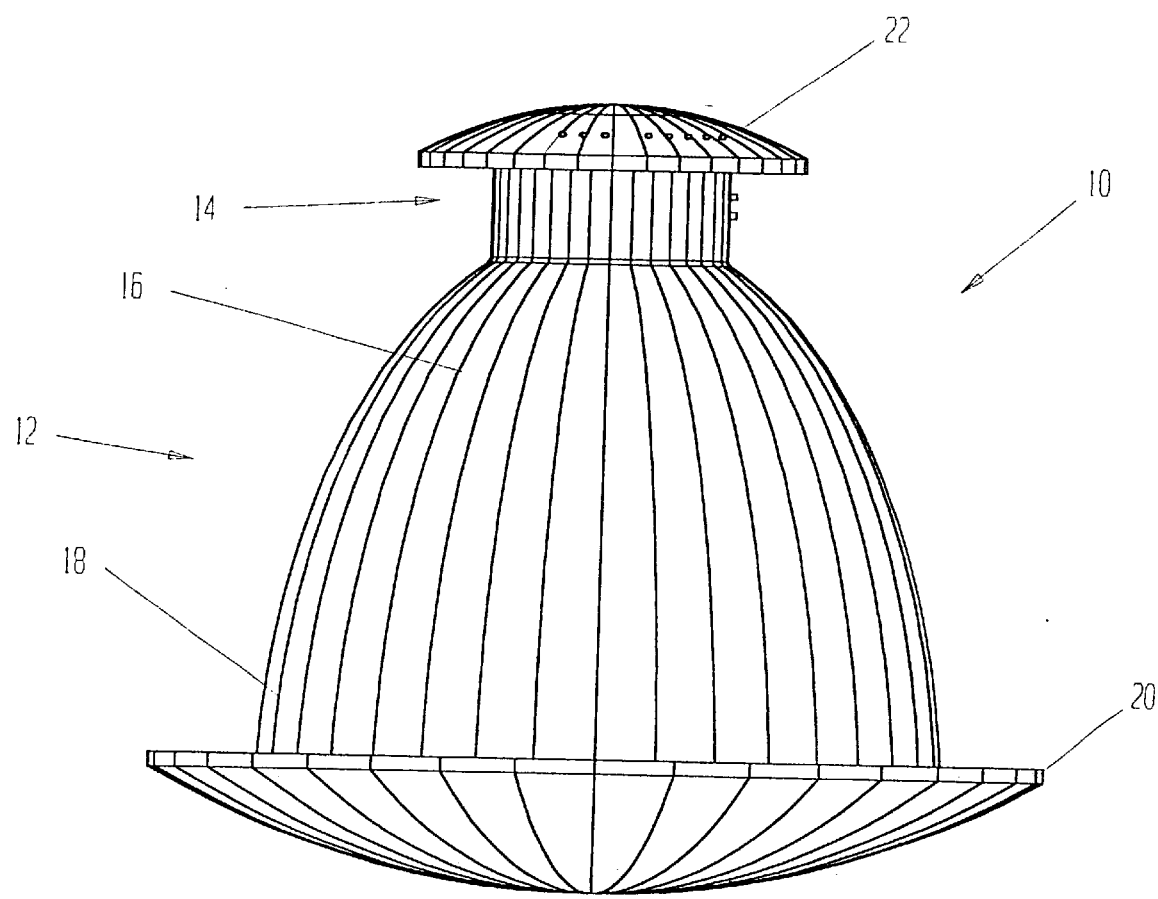
FIG. 1 is a side view of the basic embodiment of the disaster shelter of the present invention.

Referring first to FIG. 1, a side view of the basic embodiment of the disaster shelter 10 is shown. The disaster shelter 10 includes a substantially hollow paraboloid shaped shelter cell 12 and an entranceway 14 having at least one air vent opening 22 disposed therethrough. The shelter cell 12 is preferably manufactured of structural fiberglass and is oriented such that the paraboloid focus portion 16 is attached to entranceway 14 and the paraboloid base portion 18 is disposed opposite of the entranceway 14. The preferred shelter shell is a paraboloid bell having a 1:1.7 elliptical ratio. This paraboloid shape optimizes the structural integrity of the fiberglass, as it will not buckle or be destroyed by strong point forces.

A gravity ring 20 is attached to, and surrounds the paraboloid base portion 18. The preferred gravity ring 20 allows the system to remain constrained within the ground, even in areas where the water table reaches ground level, without the need for separate tie-downs or bulky concrete footings, where the water table, below which the ground is completely saturated with water. Under this circumstance, the disaster shelter 10 displaces water creating approximately 28,900 lbs. of hydrostatic pressure or upward "buoyancy" force, but is held stable in the ground by the gravity ring 20, which generates approximately 35,650 pounds of downward "gravity" force. Such a positive gravity force allows the disaster shelter 10 of the present invention to be restrained underground without the need for separate restraining cables, as are commonly used to restrain underground tanks. The elimination of these cables is a significant benefit as they create very localized stress, which may damage the structure during ground shock from heavy traffic or earthquakes. Conversely, the gravity ring 20 creates uniform stresses around the disaster shelter 10, effectively eliminating local stresses.

As noted above, it is preferred that the disaster shelter 10 be manufactured of structural fiberglass. Although other materials, such as reinforced concrete, stainless steel and the like, may be utilized, structural fiberglass is preferred for a number of reasons. First, fiberglass provides extremely high resiliency and corrosion resistance and has a tendency to remain intact if overstressed. Second, it may be easily shaped into the hollow compound curved structure that makes up the paraboloid shelter cell 12. Third, fiberglass forms a complete vapor barrier which provides a dry atmosphere when placed below ground, and it has proven to be sound in the underground storage tank industry. Fourth, structural fiberglass is a poor thermal conductor so there is little to no "sweating" on the inside walls during occupancy. Finally, structural fiberglass does not conduct electricity. This is important as hurricanes and tornadoes commonly have severe and numerous lighting strikes often topple power poles and above ground structures leaving live electrical wires sparking on the ground. Accordingly, a disaster shelter 10 manufactured from structural fiberglass is safe to use even if in direct contact with live power lines or directly struck by lightning.

Figure 2:
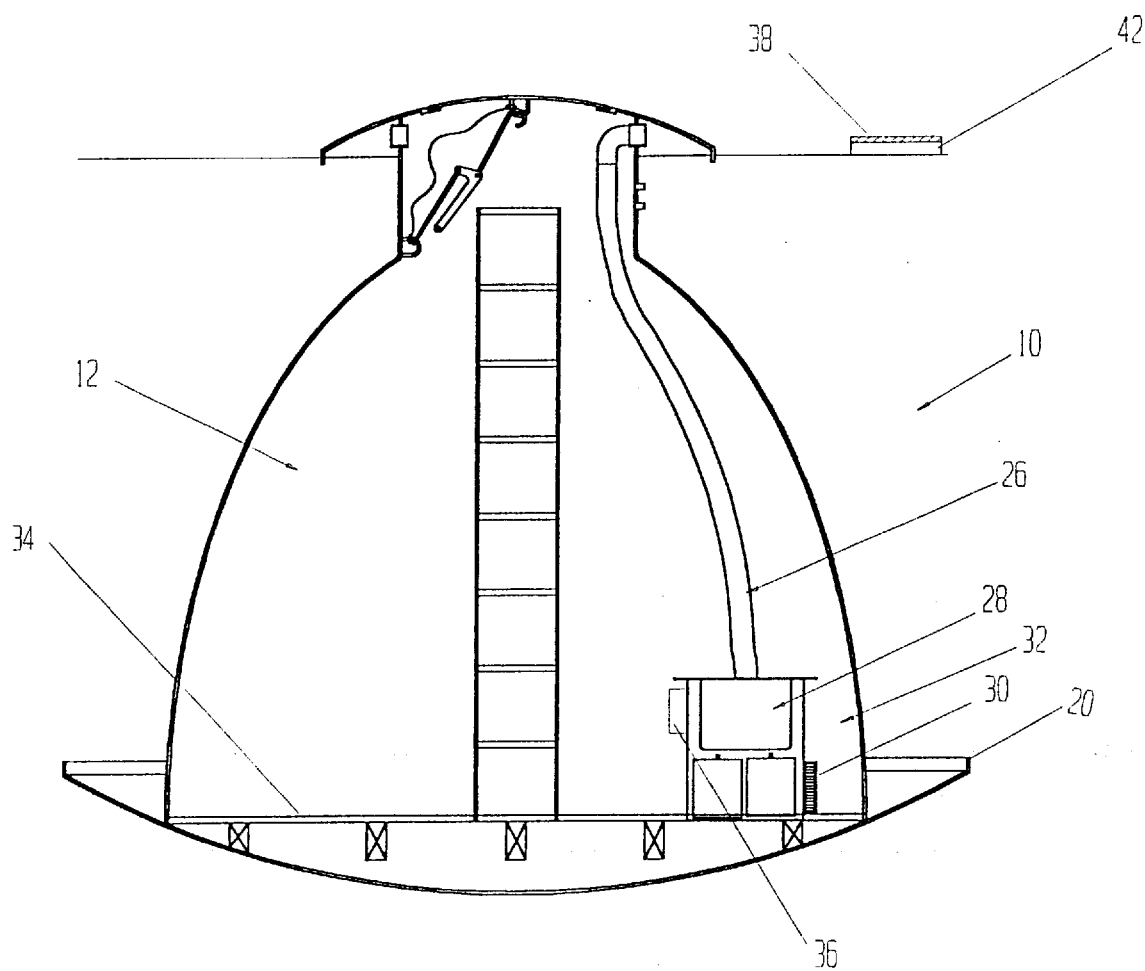
FIG. 2 is a cut-away side view of one embodiment of the disaster shelter of the present invention.

Referring now to FIG. 2, the inside of one embodiment of the disaster shelter 10 is shown. This embodiment includes a life support system 24 that provides breathable air to the occupants of the shelter 10. The life support system 24 includes an air intake duct 26 in fluid communication with an air vent (not shown). An air filter 28 is in fluid communication with the air intake duct 26 and acts to filter the incoming air. A blower 30 is in fluid communication with the outlet of the air filter 28 and circulates the air within the shelter cell 12. Finally, at least one battery 32 is placed in electrical communication with the blower 30, providing power to allow the blower to operate.

As shown in FIG. 2., the air intake duct 26 enters the shelter cell 12 through an opening in the shelter cell 12. However, in other embodiments, such at the embodiment of FIG. 3, the air intake duct 26 is disposed entirely within the shelter cell 12 and is in communication with the air vent via an air inlet 27 disposed through the entranceway 14. The air intake duct 26 is preferably manufactured of corrugated plastic smooth bore hose. However, other art recognized duct materials may be substituted to achieve similar results.

The air filter 28 receives the incoming air from the air intake duct 26 and filters it in a predetermined manner. In the preferred embodiment, the air filter 28 is a highly effective particulate air filter (hereafter HEPA filter) that is capable of removing 99.99% of particles, larger than 0.3 microns in size, from the air. Accordingly, the HEPA filter will remove all physical particles such as dust, aerosols, and pollen, from the incoming air. In other embodiments, however, the air filter 28 also includes a carbon filter (not shown) for filtering chemical and biological contaminants from the air. Such a carbon filter would preferably include both an activated carbon filter medium and a whetlerite carbon filter medium and would be disposed at the outlet of the HEPA filter.

Figure 3:
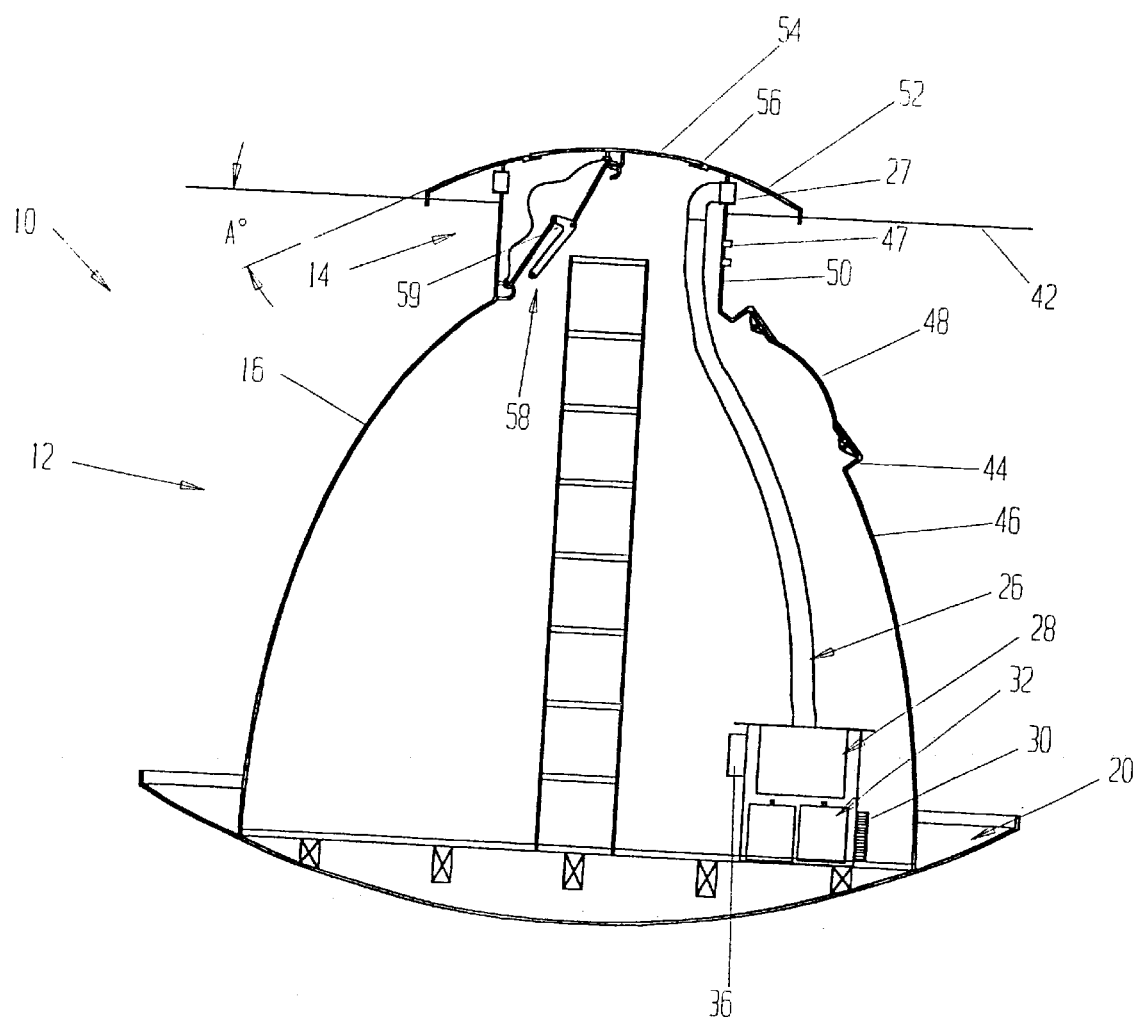
FIG. 3 is a cut-away isometric view of one embodiment of the disaster shelter of the present invention.
Figure 4:
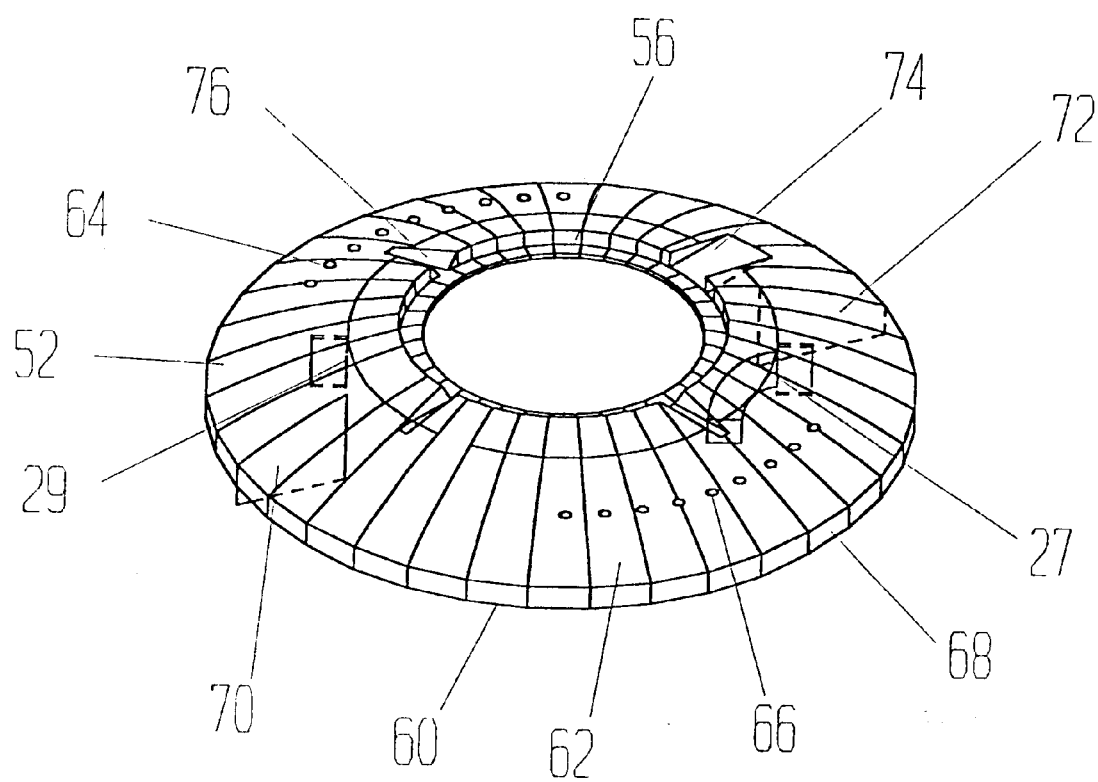
FIG. 4 is a top isometric view of the preferred hatch dome ring.

The blower 30 is in fluid communication with the outlet of the air filter 28. The The preferred blower is a battery-powered reverse curve motorized impeller. This preferred blower has a 60,000 hour life and supplies an air stream of 40 cubic feet per minute (CFM) into the interior of shelter cell 12. Given an interior volume of 474 cubic feet in the preferred shelter cell 12, the preferred blower 30 provides an air change within the shelter cell 12 every twelve minutes. The exhaust of the blower 30 is preferably positioned such that it creates cyclonic air movement within the shelter. The warm spiraling spent air rises up to vent out around the hatch dome. As shown in FIG. 2, this air is exhausted through the same air vents 22 through which incoming air is taken. However, as shown in FIGS. 3 & 4, exhaust air is vented through a dedicated air outlet 29 in other embodiments. The air supply rate and positioning of the preferred blower 30 places the shelter under positive pressure and has proven to work extremely well at maintaining constant oxygen, carbon dioxide, and moisture levels.

The preferred blower 30 includes an on/off switch that allows the blower 30 to be disengaged when ground fires, or other airborne contaminants, are present around the hatch dome. During such a time, the shelterists must breathe in a sealed shelter atmosphere. The safe duration time for sealed operation is based on a 3% carbon dioxide limit and, therefore, is a function of the number of shelterists, degree of physical activity of the shelterists, and the volume of the shelter cell 12 above the floor 34. In the preferred embodiment, six shelterists who are mildly active can be in the shelter cell 12 for approximately 4 hours before reaching the 3% $CO_2$ limit.

The battery 32 provides power to the blower 30, as well as to other electrically powered devices, such as lights, two-way radio's, scanners or the like, that are utilized within the shelter cell 12. In the preferred embodiment, the battery 32 is made up of three, twelve volt −110 amp deep cycle marine batteries contains sufficient electrical energy, when fully charged, to power the blower for up to six days at air flow rates of 40 and 60 cubic feet per minute. However, other batteries, having different power levels and providing different useful lives, may be utilized to achieve similar results. During non-disaster time, the battery 32 will suffer a very minor loss of charge. Accordingly, the preferred disaster shelter 10 also includes a battery charger 36 for recharging the battery. In the embodiment of FIG. 2, a solar panel 38 made up of photovoltaic cells is disposed above the level of the ground 42 and are wired to the battery 32. In this manner, the battery 32 is allowed to trickle charge via the electrical energy generated by the solar panel 38. However, in other embodiments, different battery chargers 36 may be utilized. For example, the battery 32 may be charged by an automobile and a heavy-duty set of jumper cables run from the automobile through the entranceway 14 to the battery 32. Likewise, an electrical wire can be run from the battery 32 through a watertight thru-hull coupling (described in detail with reference to FIG. 8). The end of this wire can be capped and buried or attached to a tree, allowing 12-volt charging from a car while the hatch cover is closed. Another method is to mount a shelter battery charger in proximity to the battery 32 and wire the battery charger into a nearby 110-volt power supply, such as a house or an underground power plant.

Referring now to FIG. 3, a cut-away side view of another embodiment of the disaster shelter 10 of the present invention is shown. The embodiment of FIG. 4 includes an emergency escape manway 44 disposed through the side wall 46 of the shelter cell 12 to provide a means of egress from the shelter in the event that the entranceway 14 is unable to be opened due to heavy debris or damage. If a heavy object, such as a car, comes to rest on top of the entranceway 14, the emergency escape manway 44 provides the shelterist with the ability to dig upwards and sideways to get around the object. Accordingly, it is preferred that crushed stone be used to backfill around the emergency escape manway 44 if the disaster shelter 10 is installed in cold climates where the ground freezes.

The preferred embodiment of the emergency escape manway 44 includes a manway cover 48 that may be unbolted from the inside of the shelter cell 12 to allow shelterists to dig upwards to the level of the ground 42. After an emergency exit, the preferred manway cover 48 may be re-bolted and backfill material can be taken up to the surface using a five-gallon bucket and rope and re-backfilled.

In the embodiment of FIG. 3, the entranceway 14 is made up of a substantially cylindrical manway 50 attached to said focus portion 16 of said shelter cell 12. A hatch dome ring 52 is disposed about, and extends outward from, the manway 50. Finally, a hatch dome cover 54 is removably attached to the hatch dome ring 52 such a weather resistant seal is formed between the hatch dome cover 54 and the hatch dome ring 52. The hatch dome cover 54 is preferably of a dome shape and is dimensioned to sit within a groove 56 in the hatch dome ring 52. In some embodiments, a common gasket is applied between the groove 56 and hatch dome cover 54 to enhance leak protection. When mounted to the preferred hatch dome ring 52, the preferred hatch dome cover 54 and hatch dome ring 52 form a dome having an angle of incidence A of approximately twenty degrees (20°). This low angle of incidence A prevents the shelter 10 from being displaced by high winds and allows the hatch dome cover 54 and hatch dome ring 52 to deflect flying debris during a tornado or hurricane without damage.

The preferred hatch dome cover 54 and hatch dome ring 52 are made of an intumescent laminate material called COMBAT COMPOSITE™ material, which is a structural fire-and bullet-resistant laminate developed by Radius Defense Inc. of Northwood, N.H. The hatch dome is also designed to protect the shelter from a fire reaching 1700° F. for one hour while maintaining its structural integrity in compliance to A.S.T.M. E119. This design and material makes the preferred shelter 10 very stealthy. It produces little or no thermal signature, little or no metallic signature, and little or no radar signature, making it almost impossible to be detected by modern target acquisition equipment. Although the hatch dome cover 54 is not impenetrable, it is manufactured according to The National Institute of Justice (NIJ) standards from Class 0 up to Class IV to resist penetration by various threats, and is specifically designed to resist seven basic assaults from people trying to break into the shelter.

As shown in FIG. 3, the hatch dome cover 54 may be secured from the inside of the shelter cell 12 via a locking mechanism 58, such as a pivot hinge 59. The preferred pivot hinge 59 is a stainless steel vertical pivot hinge that mounted inside of the entranceway 14 and is capable of lifting the hatch dome cover 54 even when it is covered with up to six tons of debris. In another embodiment, the locking mechanism 58 utilizes an external hinge that fits within a pocket (not shown) in the hatch dome ring 52 and an integral locking bar, which secures the hatch dome cover 54 to the hatch dome ring 52. The combination of the integral hinge and locking bar allows the hatch dome cover 54 to be quickly closed and locked in the event that a shelterist is pursued by an intruder, and to resist pressures of negative 5 PSIG created by a blast or tornado. In the preferred embodiment, the hatch dome cover 54 is connected to the hatch dome ring by an external recessed hinge which allows the hatch dome cover 54 to open 160 degrees. This allows fast and easy submarine type entry. Three self-positioning forged hatch clamps secure the hatch dome cover 54. In this preferred embodiment, each hatch clamp is designed to resist 5000 lbs. of uplifting force caused by the negative pressure of a tornado or explosion. Once the hatch dome cover 54 is pulled closed, the three spring-loaded hatch clamps are rotated by hand 90 degrees and the wing nut on each hatch clamp is tightened by hand.

Referring now to FIG. 4, an isometric view of the preferred hatch dome ring 52 is shown. As noted above, the hatch dome ring 52 is disposed about, and extends outward from, the manway 50. In this manner, the hatch dome ring 52 and acts to shield the air inlet 27 and air outlet 29 from the elements. The preferred hatch dome ring 52 is mounted with its bottom rim 60 disposed at ground level to prevent high winds from hitting the underside of the hatch dome ring 52. Thus, the top surface 62 of the hatch dome ring 20 includes at least one inlet vent opening 64 and at least one outlet vent opening 66 to allow gasses to enter and exit the area between the hatch dome ring and the manway 50. The top surface 62 of the preferred hatch dome ring 52 also includes a recessed groove 56 disposed about the open top for mating with the hatch dome cover (not shown) and at least one notch 74 that is sized to allow a hinge to be utilized to attach the hatch dome cover to the hatch dome ring 20. In addition, a number of rain gullies 76 may be utilized to drain trapped water from the area surrounding the recessed groove 56.

In the preferred embodiment, multiple small vent openings 64, 66 are utilized to provide sufficient airflow to and from the air inlet 27 and air outlet 29. These vent openings 64, 66 are preferably sized to prevent sabotage by an intruder utilizing an implement, such as a grappling hook. The vent openings 64, 66 on the top surface 62 of the hatch dome ring 52 are preferably not disposed directly above the air inlet 27 and air outlet 27. This arrangement causes a venturi effect, where the air and rain pass through the openings 64, 66 at high velocity and immediately slow upon entering the area under the hatch dome ring 52, effectively dropping to the rain to the ground prior to entering either the air inlet 27 or air outlet 29. The bottom surface 68 of the preferred hatch dome ring 20 includes a pair of baffles 70, 72. These baffles 70, 72 are disposed in predetermined locations relative to the air inlet 27 and air outlet 29 in order to prevent gasses exhausted through the air outlet 29 from being sucked into the air inlet 27.

In some embodiments of the invention, an entranceway such as that disclosed in the Applicant's co-pending application serial number 09/330,870, titled ENTRANCEWAY AND DISASTER SHELTER UTILIZING THE SAME, and incorporated herein by reference, is utilized. In still other embodiments, a variation of the entranceway of the Applicant's co-pending application is utilized. This alternative entranceway 14, shown with reference to FIGS. 5–7, includes a leaching septic tank 102 a vertically oriented HEPA filter 104, and a plunger valve 118 disposed between the air inlet 27 and HEPA filter 104.

Figure 5:
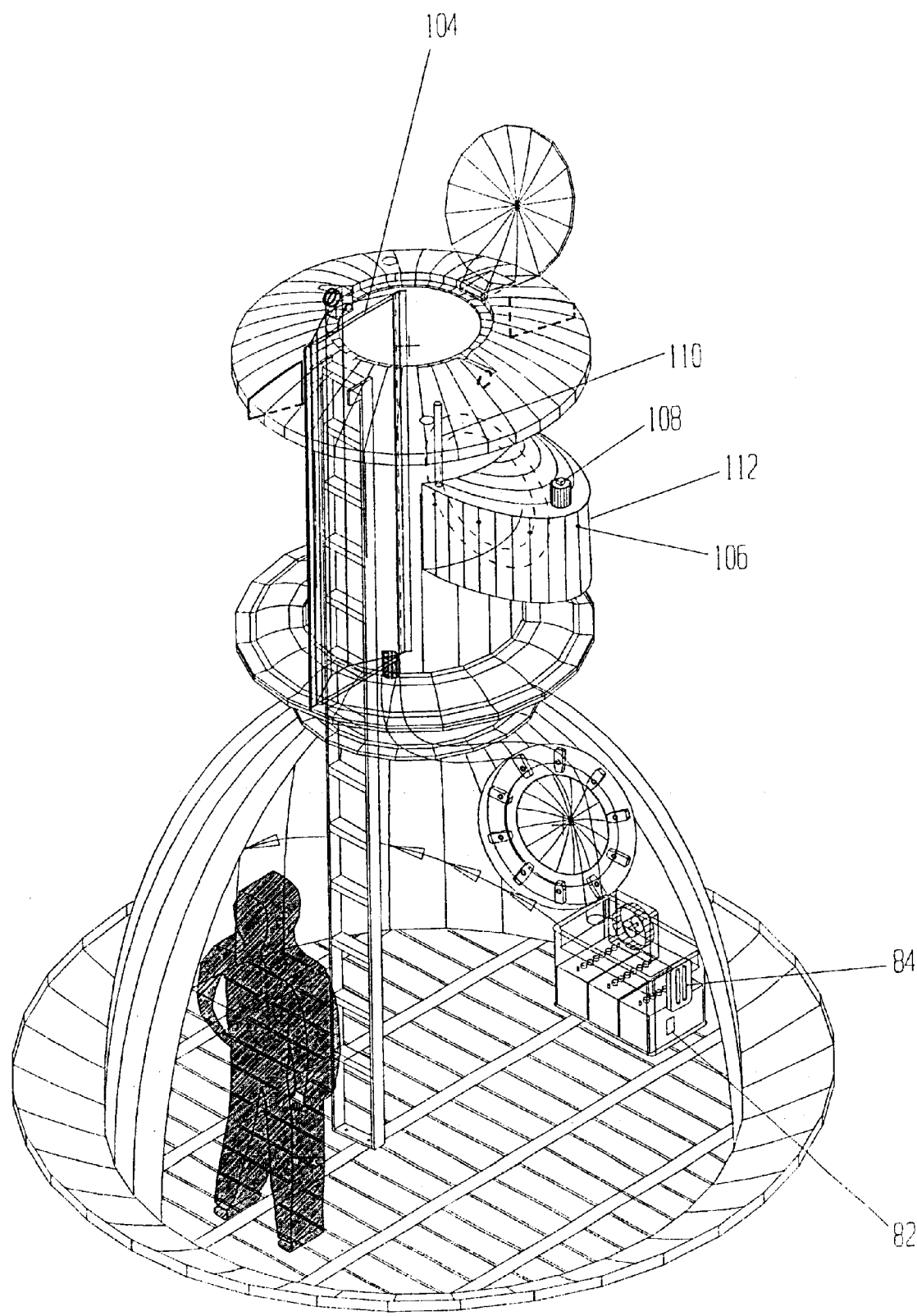
FIG. 5 is a cut away isometric view of the preferred embodiment of the disaster shelter of the present invention.

As shown in FIG. 5, the preferred septic tank 102 is an extruded half-paraboloid tank that is designed to withstand external pressure of at least 50 PSIG, such as is generated by a nuclear blast or heavy traffic over the shelter. The septic tank 102 includes a plurality of openings 106 that allow solid waste to collect within the tank 102, while allowing liquid waste to leach out into the surrounding soil. The septic tank 102 includes a pump port 108 that allows the solid and liquid wastes to be manually pumped from the tank 102. The pump port 108 is preferably disposed upon the top of the tank 102 and, when installed, is located approximately twelve inches below the level of the ground and must be excavated prior to pumping. However, in other embodiments, an extension pipe (not shown) between the pump port 108 and ground level may be included to eliminate this need to excavate. The preferred septic tank 102 also includes a septic vent 110 that passes from the tank 102 and terminates under the hatch dome ring 52 and allows gasses, such as methane, generated during decomposition to vent through the outlet vent opening 66 to the surrounding atmosphere.

Figure 6:
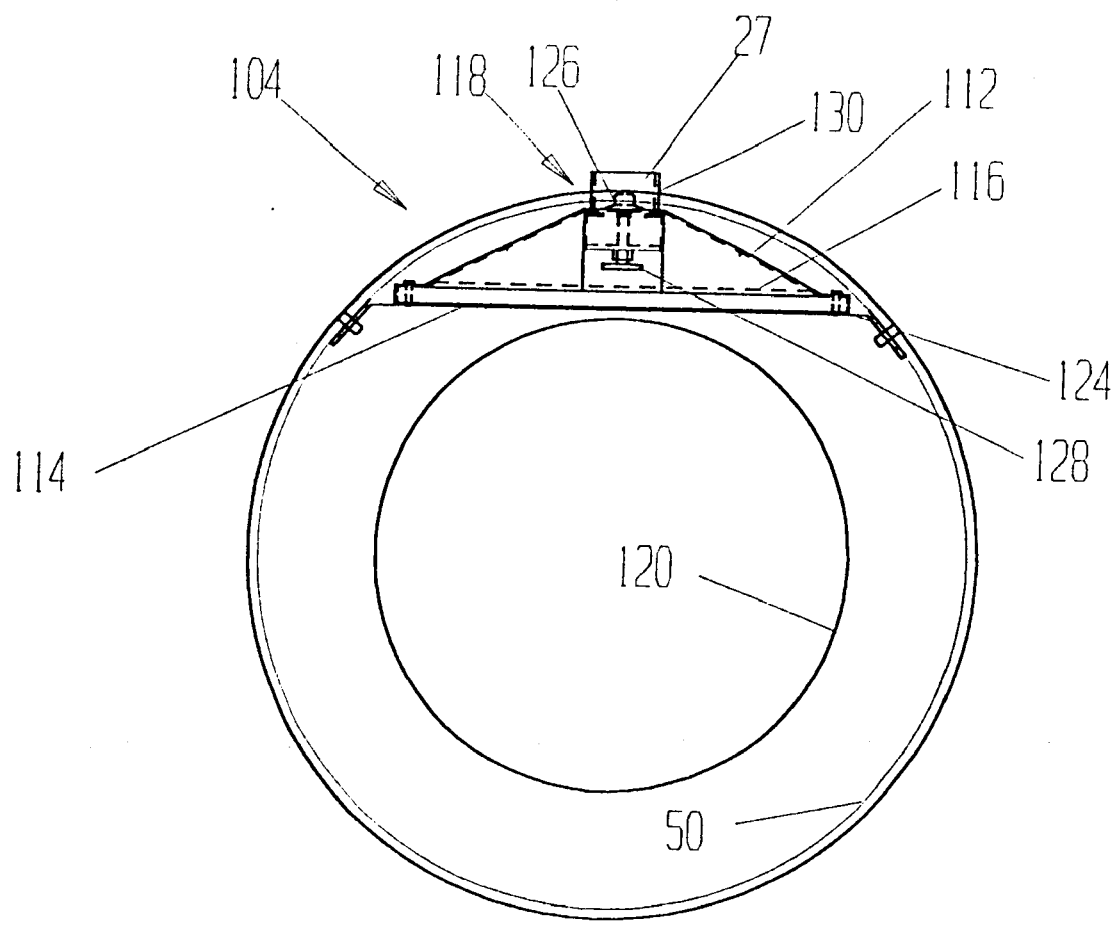
FIG. 6 is a cut away top view of one embodiment of the entranceway showing a vertically oriented HEPA filter and plunger valve.
Figure 7:
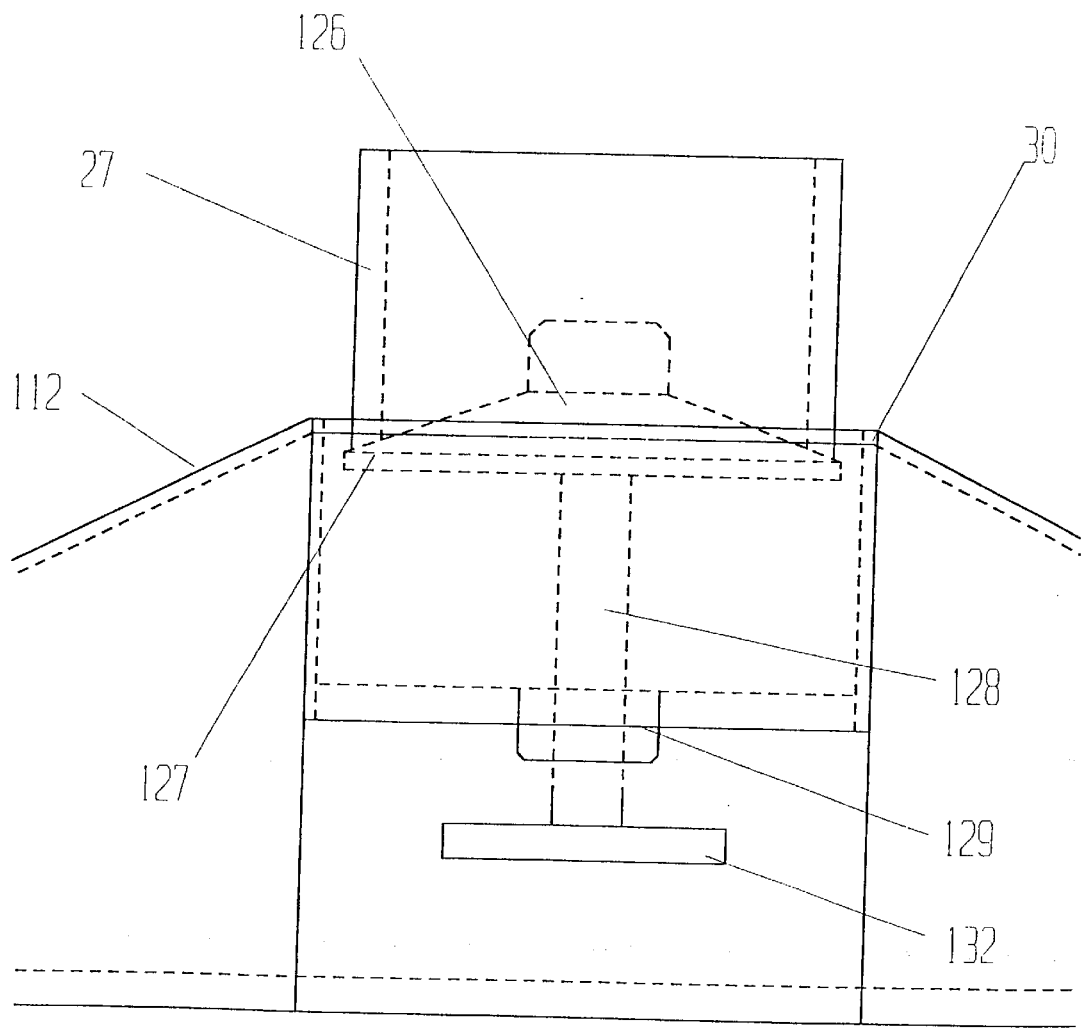
FIG. 7 is a cut away side view of the plunger valve and air inlet of the embodiment of FIG. 6.

The vertically oriented HEPA filter 104 conserves space around the entranceway 14 and allows a clear twenty-four inch diameter manway opening to be utilized. As shown in FIG. 6, the preferred HEPA filter 104 includes a HEPA housing 112, a HEPA cover 114, and a filter media 116. In addition, a plunger valve 118 is disposed between the HEPA filter 104 and the air inlet 27 to control the inflow of air through the air inlet 27 to the filter.

The HEPA housing 112 is dimensioned to fit between the manway opening 120 and the inside wall 122 of the manway 50. The HEPA housing 112 is preferably manufactured of aluminum due to the relative ease of formability of aluminum. However, other materials, such as fiberglass, can be substituted to achieve similar results. The filter media 116 is a substantially flat sheet that is clamped between the HEPA housing 112 and the HEPA cover 114. In the preferred filter 104, the filter media 116 is a coated felt material having a thickness of between 0.040 inches and 0.060 inches and is secured between the HEPA housing 112 and HEPA cover 114 via a plurality of fasteners 124, such as machine bolts, which clamp the HEPA cover 114 to the HEPA housing 112. However, it is recognized that other art recognized filter media 116 and fasteners 124 may also be substituted. Finally, in some embodiments a screen material (not shown) is disposed between the air inlet 27 and the HEPA filter 104 to prevent large particulates, such as insects and the like, from entering the HEPA filter 104.

As noted above, a plunger valve 118 is preferrably disposed between the air inlet 27 and HEPA filter 104 to control the inflow of air through the air inlet 27. As shown in detail in FIG. 7, the plunger valve 118 is mounted above the HEPA filter 104 and includes a stopper 126 mounted upon a threaded rod 128, a plunger housing 130, and a threaded fastener 129 secured to the plunger housing 130.

The stopper 126 is preferably manufactured of stainless steel and is dimensioned to seal along a mating portion 127 of the air inlet 27 such that an inflow of air may be impeded when the shelter is in use and to prevent insects, scorpions or the like from entering the shelter when the it is not in use. Although the preferred stopper 126 and mating portion 127 are manufactured of stainless steel to aid in the flow of incoming air, flat mating portions 127 and stoppers 126 manufactured of other metals, or of resilient corrosion resistant materials, may be also be substituted. The threaded rod 128 passes through a mating threaded fastener 129, which is secured to the manway 50 via a plunger housing 130. The preferred plunger housing 130 is welded to the top of the HEPA housing 112 and extends into the area between the inside of the manway 50 and the manway opening 120, allowing shelterists to access the plunger valve 118. The threaded rod 128 preferably terminates at a knurled knob 132. The threaded knob 132 is disposed within the plunger housing 130 and is dimensioned to allow a shelterist to rotate the threaded rod 128 to seat or unseat the plunger from the mating portion 127 of the air inlet.

Although the plunger valve 118 has been described with reference to its combination with the vertically oriented HEPA filter 104, it is understood that it may also be included in embodiments that do not include such a filter. Further, though the plunger valve 188 preferably includes a plunger 126, threaded rod 125 and mating threaded fastener 129, it is understood that other art recognized means of controlling airflow through an air inlet 27 may be substituted to achieve similar results.

Referring again to FIG. 5, the shelter 10 is dimensioned to allow a shelterist 80 to comfortably stand within the shelter cell 12. In addition to the features discussed above, the preferred disaster shelter 10 also includes a communication device 82 and a light 84 in electrical communication with the battery 32. It is preferred that that light 84 be flourescent light, due to the low power requirements and low heat generation of such lights. However, incandescent lights 84 may be utilized to achieve similar results. The preferred communication device 82 includes a pair of radios, such as a 12-volt CB/weather band radio and scanner. The CB/weather radio allows shelterists to keep track of tornado activity and allows two-way communications to local people. The optional scanner allows monitoring of all AM, FM, search and rescue, fire, police, aircraft, weather, and numerous other frequencies in the local area.

Figure 8:
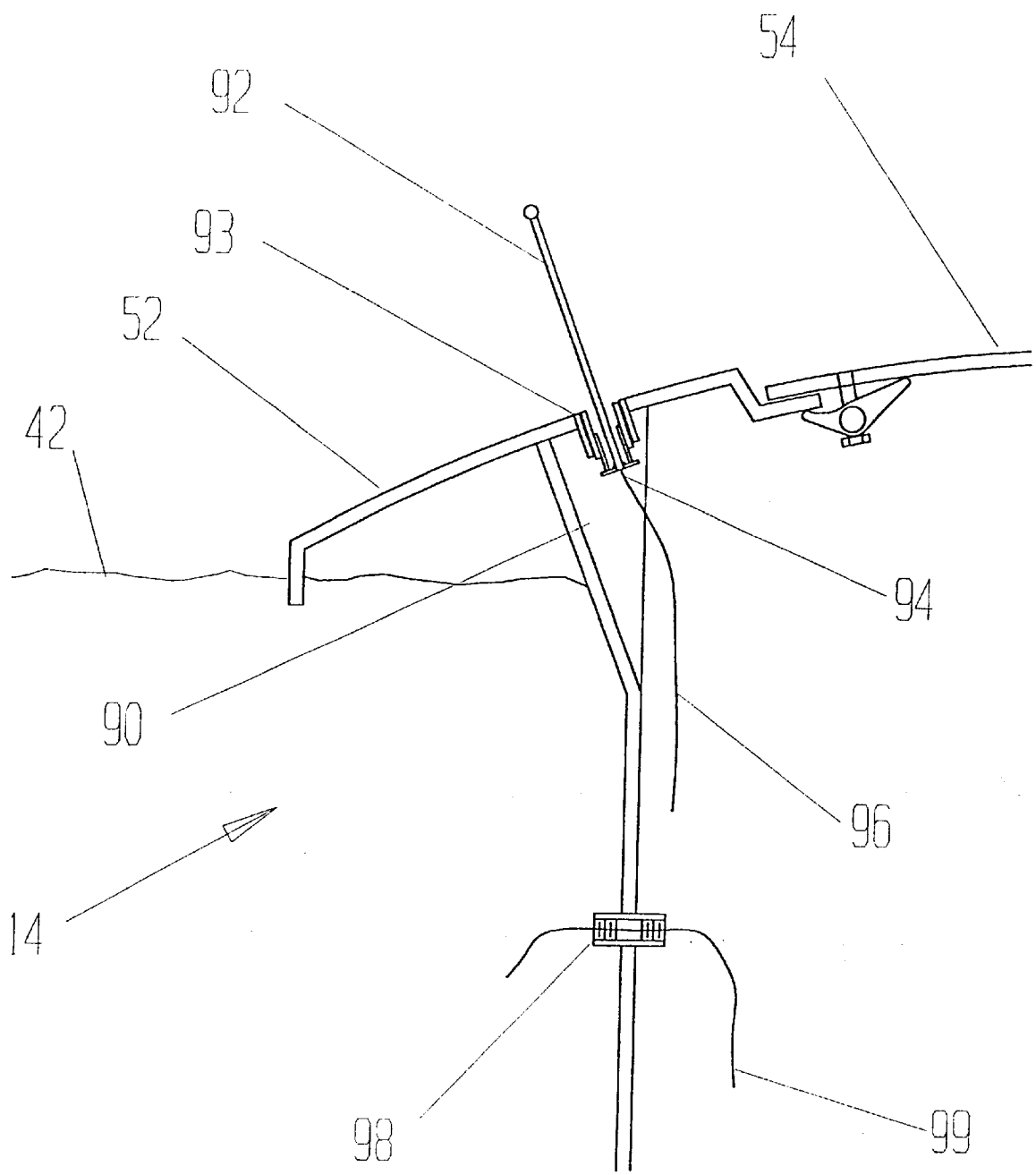
FIG. 8 is a cut away view of the preferred antenna and thru-hull coupling.

FIG. 8 shows a section view of one embodiment of the entranceway 14, which includes an antenna cavity 90 to allow the CB and scanner radio antenna 92 to be installed and removed from inside the entranceway 14. The antenna cavity 90 is preferably a cylindrical tapered cavity, having a diameter of approximately six (6) inches, and extends from the hatch dome ring 52 to just below the ground 42. In such an embodiment, the hatch dome ring 52 include a threaded coupling 93 that accepts a threaded bushing 94, which holds antenna 62. The antenna cable 96 connects to at least one radio (not shown) disposed within the shelter 10. The preferred antenna cavity 60 allows enough room for a person to hand tighten the bushing 94 into the threaded coupling 93. Although only one antenna pocket 90 is shown, it is recognized that more than one pocket may be utilized in order to accept more than one radio.

Finally, FIG. 8 also shows a thru-hull coupling 98 that allows a watertight passage for various outside services 99, such as 12 volt power lines, 110 volt power lines, telephone lines, etc., to penetrate the wall of the shelter 10 while preventing water from entering the shelter 10. Typically, one thru-hull coupling is provided for each line, with each located approximately 12 inches below ground level 42.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A disaster shelter for mounting under ground, said disaster shelter comprising
    an entranceway comprising at least one air vent;
    a substantially hollow partial paraboloid shaped shelter cell, said shelter cell having a paraboloid focus portion attached to said entranceway and paraboloid base portion disposed opposite said entranceway; and
    a gravity ring attached to said paraboloid base portion, said gravity ring being dimensioned such that said disaster shelter is constrained within the ground when a water table reaches a level of the ground.

2. The disaster shelter as claimed in claim 1 further comprising a life support system.

3. The disaster shelter as claimed in claim 2 wherein said life support system comprises an air intake duct in fluid communication with said at least one air vent, an air filter in fluid communication with said air intake duct, a blower in fluid communication with said air filter, and at least one battery in electrical communication with said blower.

4. The disaster shelter as claimed in claim 3 wherein said air filter is a highly efficient particulate air filter.

5. The disaster shelter as claimed in claim 4 wherein said highly efficient particulate air filter a vertically oriented and is disposed between a manway and a manway opening of said entranceway.

6. The disaster shelter as claimed in claim 3 further comprising a plunger valve for controlling a flow of air through said air inlet.

7. The disaster shelter as claimed in claim 3 further comprising a septic tank.

8. The disaster shelter as claimed in claim 7 wherein said septic tank is a leaching septic tank.

9. The disaster shelter as claimed in claim 7 wherein said battery charger comprises a solar panel.

10. The disaster shelter as claimed in claim 3 wherein said blower comprises an exhaust disposed within said shelter cell and wherein said exhaust is positioned to create cyclonic air movement within said shelter cell.

11. The disaster shelter as claimed in claim 3 wherein said at least one battery comprises at least one twelve volt deep cycle battery, and wherein said at least one battery contains sufficient electrical energy when fully charged to power said blower to supply between 40 and 60 cubic feet per minute of air for six days.

12. The disaster shelter as claimed in claim 3 further comprising a battery charger in electrical communication with said at least one battery.

13. The disaster shelter as claimed in claim 1 wherein said entranceway further comprises a substantially cylindrical manway attached to said focus portion of said shelter cell, a hatch dome ring disposed about, and extending outward from, said manway, and a hatch dome cover removably attached to said hatch dome ring such that said hatch dome cover forms a weather resistant seal with said hatch dome ring.

14. The disaster shelter as claimed in claim 13 wherein manway comprises an air inlet and an air outlet, wherein said hatch dome ring comprises at least one inlet vent opening and at least one outlet vent opening, and wherein said inlet vent opening and said outlet vent opening are dimensioned and disposed relative to said air inlet and said air outlet such that rain is prevented from entering said air inlet and said air outlet.

15. The disaster shelter as claimed in claim 13 wherein said hatch dome cover and said hatch dome ring form a substantially continuous surface, said surface being dimensioned to protect said disaster shelter from damage due to a disaster.

16. The disaster shelter as claimed in claim 15 wherein said surface is substantially dome shaped and has an angle of incidence of less than twenty degrees.

17. The disaster shelter as claimed in claim 1 further comprising a communication device.

18. The disaster shelter as claimed in claim 17 wherein said communication device comprises radio and a retractable antenna.

19. The disaster shelter as claimed in claim 1, wherein said shelter cell is manufactured of structural fiberglass.

20. The disaster shelter as claimed in claim 1 further comprising an emergency escape manway disposed through a side wall of said shelter cell.

* * * * *